US011408902B2

(12) United States Patent
Waldburger (10) Patent No.: US 11,408,902 B2
(45) Date of Patent: Aug. 9, 2022

(54) METHOD TO STORE SAMPLE TUBES IN A LABORATORY STORAGE AND RETRIEVAL SYSTEM

(71) Applicant: Roche Diagnostics Operations, Inc., Indianapolis, IN (US)

(72) Inventor: Stefan Waldburger, Ebikon (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 293 days.

(21) Appl. No.: 16/156,348

(22) Filed: Oct. 10, 2018

(65) Prior Publication Data
US 2019/0113533 A1 Apr. 18, 2019

(30) Foreign Application Priority Data
Oct. 18, 2017 (EP) .................................. 17197107

(51) Int. Cl.
*G01N 35/00* (2006.01)
*G01N 35/04* (2006.01)
*B01L 9/06* (2006.01)

(52) U.S. Cl.
CPC ... *G01N 35/00732* (2013.01); *G01N 35/0092* (2013.01); *G01N 35/0095* (2013.01);
(Continued)

(58) Field of Classification Search
CPC ......... G01N 35/00732; G01N 35/0092; G01N 35/0094; G01N 2035/00831;
(Continued)

(56) References Cited

U.S. PATENT DOCUMENTS 5,150,795 A * 9/1992 Nakayama ............ B01L 3/5453
209/3.3
7,842,237 B1 * 11/2010 Shibuya ............... G01N 35/026
422/64
(Continued)

FOREIGN PATENT DOCUMENTS

EP 1156434 A1 11/2001
EP 1248170 A1 10/2002
(Continued)

*Primary Examiner* — Jill A Warden
*Assistant Examiner* — John McGuirk
(74) *Attorney, Agent, or Firm* — Roche Diagnostics Operations, Inc.

(57) ABSTRACT

A method to store sample tubes in a laboratory storage and retrieval system is presented. The laboratory storage and retrieval system comprises a storage section, a database comprising a sample tube inventory of the storage section, a control device, and at least one sample tube transport system. The storage section comprises at least two storage subsections. In a first step of the method, the control device identifies at least two sample tubes with at least one substantially identical sample tube attribute and distributed over the at least two storage subsections. In a second step of the method, the at least one sample tube transport system consolidates the at least two sample tubes in at least one storage subsection, wherein the control device further determines in which of the at least two storage subsections the identified sample tubes are consolidated.

14 Claims, 7 Drawing Sheets

(52) U.S. Cl.
CPC ............... *G01N 35/04* (2013.01); *B01L 9/06* (2013.01); *G01N 2035/0094* (2013.01); *G01N 2035/00831* (2013.01); *G01N 2035/00851* (2013.01); *G01N 2035/0406* (2013.01); *G01N 2035/0412* (2013.01); *G01N 2035/0425* (2013.01); *G01N 2035/0462* (2013.01); *G01N 2035/0465* (2013.01); *G01N 2035/0494* (2013.01)

(58) Field of Classification Search
CPC . G01N 2035/00851; G01N 2035/0094; G01N 2035/0406; G01N 2035/0412; G01N 35/04; G01N 35/0095; G01N 2035/0425; G01N 2035/0462; G01N 2035/0465; G01N 2035/0494; B65G 1/1373; B65G 2201/0258; B65G 1/0485; B65G 1/137; B65G 47/905; B65G 1/06; B65G 2201/0235; B65G 47/917; B65G 1/1371; B01L 9/06; B01L 2200/18
See application file for complete search history.

(56) References Cited

U.S. PATENT DOCUMENTS

| | | | |
|---|---|---|---|
| 2004/0037679 A1 | 2/2004 | Sato et al. | |
| 2007/0254277 A1* | 11/2007 | Scrabeck | G16H 10/40 435/4 |
| 2010/0028124 A1 | 2/2010 | Lackner et al. | |
| 2010/0049358 A1* | 2/2010 | Koch | G06F 17/00 700/214 |
| 2010/0300944 A1* | 12/2010 | Carpenter | B07C 3/00 209/546 |
| 2013/0123089 A1* | 5/2013 | Johns | B65G 47/28 494/37 |
| 2014/0037517 A1 | 2/2014 | Takai | |
| 2014/0079527 A1 | 3/2014 | Takai et al. | |
| 2014/0109527 A1 | 4/2014 | Burri et al. | |
| 2015/0166265 A1* | 6/2015 | Pollack | G01N 35/04 700/230 |
| 2015/0266679 A1 | 9/2015 | Frank et al. | |
| 2015/0276774 A1* | 10/2015 | Pollack | B65G 17/32 414/749.1 |

FOREIGN PATENT DOCUMENTS

| | | |
|---|---|---|
| EP | 2148204 B1 | 1/2010 |
| EP | 2148205 A1 | 1/2010 |
| EP | 2693220 A2 | 2/2014 |
| EP | 2913787 A1 | 9/2015 |
| JP | 2002-040034 A | 2/2002 |
| WO | 2013/070748 A1 | 5/2013 |
| WO | 2014/048473 A1 | 4/2014 |
| WO | 2017/081413 A1 | 5/2017 |

* cited by examiner

| Sample tube inventory of storage section, 22-Sep-2017, 1pm | | | | | Sample tube attributes | | | | |
|---|---|---|---|---|---|---|---|---|---|
| Sample tube identity | boarding timestamp | onboard time | scheduled storage time | scheduled retrieval time point | retrieval time | scheduled disposing time point | sample tube type | sample tube content | Sample tube position |
| 26a | 22-Sep-2017 8am | 5 hours | 1 week | 22-Sep-2017 5pm | 3 minutes | 29-Sep-2017 8am | A | Blood | Part of storage section 22a Sample tube storage rack 24a Sample tube storage position 30a |
| 26b | 22-Sep-2017 10am | 3 hours | 2 weeks | 22-Sep-2017 5pm | 5 minutes | 29-Sep-201710 8am | B | Blood | Part of storage section 22b Sample tube storage rack 24d Sample tube storage position 30d |
| 26c | 20-Sep-2017 8am | 53h | 3 weeks | - | 3 minutes | 27-Sep-2017 8am | A | Blood | Part of storage section 22a Sample tube storage rack 24c Sample tube storage position 30a |

METHOD TO STORE SAMPLE TUBES IN A LABORATORY STORAGE AND RETRIEVAL SYSTEM

CROSS-REFERENCE TO RELATED APPLICATIONS

This application claims priority to EP 17197107.0, filed Oct. 18, 2017, which is hereby incorporated by reference.

BACKGROUND

The present disclosure generally relates to the field of automated laboratory sample tube handling and, in particular, to a method, a laboratory storage and retrieval system, a computer program product, and a computer-readable medium for storing sample tubes in the laboratory storage and retrieval system in an efficient way.

In automated diagnostic laboratory environments, a high number of sample tubes containing liquid test samples are transported between multiple stations such as pre-analytical, analytical and post-analytical stations for test sample processing steps according to predefined laboratory workflows in a cautious but still efficient manner in order to produce accurate and reliable test results which represent pivotal information for physicians. Post-analytical stations can usually be used for post-processing steps of test samples like the storage of sample tubes, retrieval of stored sample tubes if further test sample processing steps like an additional test or analysis of a test sample has to be conducted, and disposal of expired sample tubes A laboratory storage and retrieval system to store sample tubes and retrieve stored sample tubes with different sizes, heights, diameters, contents, and the like are known. Prior to the storage, sample tubes from incoming primary sample tube racks are resorted into sample tube storage racks on the basis of given sort criteria for a more effective use of the available storage place.

With improved through-puts and turn-around times of automated pre-analytical and analytical systems, the number of sample tubes which have to be stored and the demand of the corresponding storage space in post-analytical stations are increasing. However, storage space in laboratories is often limited and expensive and therefore needs to be used to their utmost efficiency. Additionally, laboratory IT solutions such as middleware solutions or laboratory information systems are capable to define and control complex laboratory workflows in an efficient manner which causes an increased number and frequency of retrievals of stored sample tubes from the laboratory storage and retrieval system. At the same time, the retrieval time of stored sample tubes from the laboratory storage and retrieval system should be as short as possible so that the availability and transport of stored sample tubes to pre-analytical and analytical systems for further test sample processing steps are not the limiting factors in the laboratory workflow and generated test results can be provided on time and required quality for further diagnosis.

Therefore, there is a need to improve the capacity as well as the performance of laboratory storage and retrieval systems in a simple, reliable and cost-efficient way by improving conventional sample tube storing methods, particularly to better serve the needs of automated diagnostic laboratory environments.

SUMMARY

According to the present disclosure, a method, a laboratory storage and retrieval system, a computer program product, and a computer-readable medium to store sample tubes in the laboratory storage and retrieval system are disclosed.

The present disclosure relates to a method to store sample tubes in a laboratory storage and retrieval system. The laboratory storage and retrieval system can comprise a storage section, a database comprising a sample tube inventory of the storage section, a control device, and at least one sample tube transport system. The storage section can comprise at least two storage subsections. The control device can control the database comprising the sample tube inventory of the storage section and the at least one sample tube transport system. The method can comprise identifying by the control device at least two sample tubes with at least one substantially identical sample tube attribute and distributed over the at least two storage subsections and consolidating by the at least one sample tube transport system the at least two sample tubes in at least one storage subsection.

The present disclosure also relates to a laboratory storage and retrieval system which can comprise a storage section, a database comprising a sample tube inventory of the storage section, a control device, and at least one sample tube transport system configured to execute the method to store sample tubes in the laboratory storage and retrieval system as described herein.

The present disclosure further relates to a computer program product comprising instructions to cause the laboratory storage and retrieval system as described herein to execute the method to store sample tubes in the laboratory storage and retrieval system as described herein.

The present disclosure also relates to a computer-readable medium having stored thereon the computer program product comprising instructions to cause the laboratory storage and retrieval system as described herein to execute the method to store sample tubes in the laboratory storage and retrieval system as described herein.

Accordingly, it is a feature of the embodiments of the present disclosure to improve the capacity as well as the performance of laboratory storage and retrieval systems in a simple, reliable and cost-efficient way. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

The present disclosure relates to a method to store sample tubes in a laboratory storage and retrieval system. The laboratory storage and retrieval system can comprise a storage section, a database comprising a sample tube inventory of the storage section, a control device, and at least one sample tube transport system. The storage section can comprise at least two storage subsections. The control device can control the database comprising the sample tube inventory of the storage section and the at least one sample tube transport system. The method can comprise the following steps: a) the control device identifies at least two sample tubes with at least one substantially identical sample tube attribute and distributed over the at least two storage subsections and b) the at least one sample tube transport system consolidates the at least two sample tubes in at least one storage subsection.

As used herein, the term "sample tube" can relate to a vessel configured to receive, store, transport, and/or release a sample tube content such as a test sample (e.g., blood, urine, serum, plasma, or liquefied biopsy sample, etc.) from which the presence and if desired the concentration of an analyte can be determined using an analytical station. Depending on the sample tube content, sample processing steps to be carried out, manufacturer of the material as well as the dimension of the sample tube like diameter, side length, height and geometry can vary. The sample tube may be a vessel with a cylindrical shape, a closed bottom, and an open top. Alternatively, the closed bottom of the cylindrical vessel can be rounded. The sample tube may be equipped with a cap or lid, either connected to the sample tube or provided independently. The caps or lids may be made of different materials and may have different shapes and dimensions. Alternatively, the sample tube may be sealed. The sample tube may be provided with a barcode or RFID label for identification purposes. For storing sample tubes in the laboratory storage and retrieval system, the sample tubes can be inserted into sample tube storage positions which are holding openings of sample tube storage racks. Such sample tube storage racks may be multi-row racks comprising multiple sample tube storage positions (e.g., three rows with more than ten sample tube storage positions, for example 13 to 14 sample tube storage positions). A sample tube storage rack may be designed as described in EP2148204B1 which is hereby incorporated by reference, reference sign SR in FIGS. 3, 4, 5, 13 and corresponding description.

As used herein, the term "laboratory storage and retrieval system" can relate to a laboratory device for handling sample tubes in the context of storing sample tubes, retrieving stored sample tubes, wasting expired sample tubes, and/or consolidating sample tubes. The laboratory storage and retrieval system can be a post-analytical station. It can be used for post-processing steps of test samples like the storage of already processed or analyzed sample tubes. Furthermore, also retrieval of stored sample tubes can become necessary if further test sample processing steps are necessary. For instance, an additional test or analysis of a test sample has to be conducted, or any already conducted test needs to be repeated due to inconsistency or failure of the analysis. Finally, disposal of expired sample tubes can be automated. The laboratory storage and retrieval system may comprise a storage section for storing sample tubes under predefined and controlled storing conditions, a database comprising a sample tube inventory of the storage section, at least one sample tube transport system for transporting sample tubes, and a control device which controls the database and the at least one sample tube transport system so that the space of the storage section is optimally used. A laboratory storage and retrieval system may be designed as described in EP2148204B1 which is hereby incorporated by reference, reference number 10 in FIG. 1 and corresponding description.

As used herein, the term "storage section" can relate to a cabinet of various sizes which can be able to store a plurality of sample tubes in sample tube storage racks which can be transported into the storage section through a gate. The storage section may have a tempering unit to hold the ambient temperature for the sample tubes within the storage section below room temperature, possibly below about 18° C. and possibly below about 10° C. In its inside, the storage section may comprise a plurality of shelves for the storage of a high number of sample tube storage racks in predefined rack storage positions. The storage section may further have, in addition or alternatively to shelves, compartmented trays or inserts for the sample tube storage racks. Further, shelves or compartments with different heights may be provided in order to be able to optimize available space when storing sample tubes of different heights.

As used herein, the term "storage subsection" can relate to a part or division of the storage section designated for storing a part of all stored sample tubes or a group of sample tubes which have common sample tube attributes. For example, the storage section can be partitioned or divided into different subsections for storing sample tubes which have at least one substantially identical sample tube attribute. A storage subsection can be a part of the storage section like a front or rear part of the storage section comprising at least two rack storage positions for storing sample tube storage racks. Alternatively, a storage subsection can be a sample tube storage rack comprising at least two sample tube storage positions for storing sample tubes. Storage subsections may have different positions relative to the gate of the storage section and different storing conditions like temperature or humidity. Also the number of rack storage positions or sample tube storage positions may vary between storage subsections.

The term "control device" as used herein can encompass any physical or virtual processing device configurable to control the laboratory storage and retrieval system in a way that sample tube handling steps like storing, retrieving, wasting, and/or consolidating of sample tubes can be conducted by the laboratory storage and retrieval system. The control device may, for example, analyze the database comprising the sample tube inventory of the storage section in order to identify at least two sample tubes which can have at least one substantially identical sample tube attribute and can be distributed over at least two storage subsections. The control device may further determine in which of the at least two storage subsections the identified sample tubes can be consolidated. The control device may instruct the at least one sample tube transport system to transport sample tubes in order to consolidate the identified sample tubes in the determined at least one storage subsection. After consolidation of the at least two identified sample tubes, the control device may further update the sample tube inventory on the database. The control device may receive information from a data management unit regarding which sample tube handling steps need to be performed for which sample tubes and at what time. The control device may, for instance, be embodied as a programmable logic controller configured to execute a computer-readable program provided with instructions to perform sample tube handling steps of the laboratory storage and retrieval system. One example of such a sample tube handling step can be to control the movements of the at least one sample tube transport system in order to consolidate sample tubes with at least one substantially identical sample attribute in at least one storage subsection.

As used herein the term "sample tube transport system" can relate to a transport system designed to transport sample tubes to rack storage positions, sample tube storage positions, or to a disposal unit of the laboratory storage and retrieval system. The sample tube transport system may comprise a sample tube rack transport device for transporting sample tubes which can be inserted in a sample tube storage rack to rack storage positions or to a disposal unit, a resorting station for transporting individual sample tubes to sample tube storage positions within the same or between different sample tube storage racks, or a combination of a sample tube rack transport device and resorting station.

As used herein the term "sample tube attribute" can relate to characteristics of the sample tube, characteristics of the sample tube content, and/or information associated with the sample tube. Characteristics of the sample tube can be, as non-limiting examples, the geometry or dimension of the sample tube and/or sample tube cap. Characteristics of the sample tube content can be, as non-limiting examples, sample type, sample expiration date, sample weight, or sample volume. Information associated with the sample tube can be, as non-limiting examples, time data about already conducted or planned sample tube handling steps like storing, retrieving, and/or wasting of sample tubes.

As used herein the term "substantially identically sample tube attribute" can relate to a sample tube attribute tube of at least two sample tubes which can be either equal or similar. For example, sample tubes with a substantially identical boarding timestamp can have been transported into the storage section at the same time point (e.g., sample tubes within the same sample tube storage rack) or within the same predefined time range (e.g., within one hour or working shift)

The term "consolidate" as used herein can relate to a sample tube handling step where at least two sample tubes which have at least one substantially identical sample tube attribute and can be distributed over at least two storage subsections can be pooled or brought together to at least one storage subsection of the storage section by the at least one sample tube transport system which can be controlled by the control device. Thus, sample tubes with at least one substantially identical sample tube attributes can be grouped or aggregated in at least one storage subsection with the advantage that sample tubes with at least one substantially identical sample tube attribute can be handled more efficiently which can improve the performance as well as the capacity of the storage and retrieval system.

In one embodiment of the method, step b) of the method may comprise one or more of the following sub-steps:

In a first sub-step of step b), the control device may determine the at least one storage subsection in which the at least two sample tubes with the at least one substantially identical sample tube attribute can be consolidated. The determination of the storage subsection may depend on the at least one substantially identical sample tube attribute of the two sample tubes. In addition, or alternatively, the determination of the storage subsection may also depend on the number of sample tubes to be consolidated and the number of vacant rack storage positions or sample tube storage positions within each of the at least two storage subsections.

In a second sub-step of step b), the control device may further check whether at least one vacant rack storage position or sample tube storage position is available or not in the at least one storage subsection which was determined for consolidating the at least two identified sample tubes having at least one substantially identical sample tube attribute. If at least one vacant rack storage position or sample tube storage position is available in the determined storage subsection, the sample tube transport system can transport at least one of the at least two sample tubes to the determined subsection as described in the fourth sub-step below.

In a third sub-step of step b), if no rack storage position(s) within the determined storage subsection is vacant, at least one sample tube storage rack with sample tubes which have not to be consolidated can be transported to a disposal unit of the laboratory storage and retrieval system or to a vacant rack storage position which may be located outside of the determined subsection for temporary storage; or in a third sub-step of step b), if no sample tube storage position(s) within the determined storage subsection is vacant, at least one sample tube which has not to be consolidated can be transported to a vacant sample tube storage position of sample tube storage rack with sample tubes which have not to be consolidated; or if no rack storage position(s) or sample tube storage position(s) are vacant in the at least one determined storage subsection, step b) of the method can be aborted.

In a fourth sub-step of step b), the at least one sample tube transport system can transport the at least one of the at least two identified sample tubes to the at least one storage subsection which was determined for consolidating the at least two sample tubes with the at least one substantially identical sample tube attribute.

In one embodiment of the method, the at least one sample tube transport system can comprise a sample tube rack transport device. The at least two storage subsections can be at least two parts of the storage section and each part of the storage section can comprise at least two rack storage positions. The control device can control the sample tube rack transport device which can transport sample tube storage racks within the storage section to process step b).

The term "sample tube rack transport device" as used herein can relate to a device designed to transport sample tube storage racks to rack storage positions or to a disposal unit of the laboratory storage and retrieval system. Such sample tube rack transport devices are well known in the art. In addition to rack storage positions within the storage section, the laboratory storage and retrieval system may further comprise at least one rack storage position which can be located outside of the storage section and can be used for the temporary storage of sample tube racks. So, the sample tube rack transport device can transport sample tube storage racks to rack storage positions within the storage section and between the storage section and rack storage positions outside the storage section through the gate of the storage section for the temporary storage of stored sample tube storage racks when for example vacant rack storage position(s) can be required for consolidating sample tubes or for the transport of new incoming sample tubes into the storage section. Additionally, the sample tube rack transport device can transport sample tube storage racks to the disposal unit of the laboratory storage and retrieval system where sample tube storage racks can be placed for the disposal of expired sample tubes or for the temporary storage of sample tube storage racks when for example vacant rack storage position(s) can be required for consolidating sample tubes having at least one substantially identical sample tube attribute in at least one storage subsection.

In one embodiment, the at least two parts of the storage section may be a front part and a rear part of the storage section, wherein the front part can be closer to the gate of the storage section compared to the rear part. The front and the rear parts of the storage section may have different dimensions, sample tube storing capacities (e.g., different number of rack storage positions or sample tube storage positions), and/or storing conditions such as, for example, temperature or humidity.

In another embodiment, the at least two parts of the storage section may be an upper part and lower part of the storage section, wherein the upper or the lower part of the storage section can be closer to the gate of the storage section. The upper and the lower part of the storage section may have different dimensions, sample tube storing capacity (e.g., different number of rack storage positions or sample tube storage positions), and/or storing conditions such as, for example, like temperature or humidity.

In a further specific embodiment, step b) of the method may comprise the following sub-steps:

In a first sub-step of step b), the control device may determine the at least one storage subsection in which the at least two sample tubes with the at least one substantially identical sample tube attribute can be consolidated. This determination of the storage subsection may depend on the at least one substantially identical sample tube attribute of the at least two sample tubes. For example, sample tubes which have the at least one substantially identical sample tube attribute scheduled retrieval time point and for which a retrieval can be scheduled within the next 24 hours can be consolidated in one of the least two storage subsections which is closer to the gate of the storage section. This can have the advantage that the retrieval time of consolidated sample tubes can be minimized.

In a second sub-step of step b), the control device may further check whether at least one vacant rack storage position is available or not in the at least one storage subsection which was determined for consolidating the identified at least two sample tubes having at least one substantially identical sample tube attribute. If at least one vacant storage position is available in the determined storage subsection, the sample tube rack transport device can transport the at least one of the at least two identified sample tubes to the determined subsection as described in the fourth sub-step below.

In a third sub-step of step b), if no rack storage position(s) within the determined storage subsection is vacant, at least one sample tube storage rack with sample tubes which have not been consolidated can be transported to the disposal unit of the laboratory storage and retrieval system or to a vacant rack storage position which may be located outside of the determined subsection for temporary storage; or if no rack storage position(s) are vacant in the determined storage subsection, step b) of the method can be aborted.

In a fourth sub-step of step b), the sample tube rack transport device can transport the at least one of the at least two sample tubes to the at least one storage subsection which was determined for consolidating the at least two sample tubes with the at least one substantially identical sample tube attribute.

In one embodiment of the method, the at least one sample tube transport system can comprise a resorting station or a resorting station and a sample tube rack transport device. The at least two storage subsections can be at least two sample tube storage racks and each sample tube storage rack can comprise at least two sample tube storage positions. The control device can control the resorting station which can resort sample tubes between at least two sample tube storage racks or the resorting station which can resort sample tubes between at least two sample tube storage racks and the sample tube rack transport device which can transport sample tube storage racks within the storage section and between the storage section and the resorting station to process step b).

The term "resorting station" as used herein can relate to a device designed to transport individual sample tubes to sample tube storage positions within the same or between different sample tube storage racks. So, the resorting station can sort and/or resort sample tubes between at least two sample tube storage racks. The sorting/resorting may be based on sample tube attributes in order to consolidate sample tubes having a substantially identical sample tube attribute in one sample tube storage rack. Depending on the at least one substantially identical sample tube attribute, the at least one subsection in which the at least two sample tubes with the at least substantially identical sample tube attribute are consolidated can be determined. The resorting station may comprise a robotic arm equipped with a sample tube gripper. Such resorting stations are well known in the art. A resorting station may be designed as described in EP2148204B1 which is hereby incorporated by reference, reference number 310 in FIG. 1 and corresponding description.

In one embodiment, the resorting station may be positioned within the storage section in such a manner that the gripper attached the robotic arm may be able to reach any sample tube storage position within the storage section for accessing the stored sample tubes for resorting. Step b) may comprise the following sub-steps:

In a first sub-step of step b), the control device may determine the at least one storage subsection in which the at least two sample tubes with the at least one substantially identical sample tube attribute can be consolidated. The determination of the storage subsection may depend on the at least one substantially identical sample tube attribute of the two sample tubes. In addition, or alternatively, the determination of the storage subsection may also depend on the number of sample tubes to be consolidated and the number of vacant sample tube storage positions within each of the at least two storage subsections. For example, if sample tubes from two partially filled sample tube storage racks have to be consolidated in one of the two sample tube storage racks, sample tubes from the sample tube storage rack with less sample tubes can be consolidated in the sample tube storage rack more sample tubes.

In a second sub-step of step b), the control device may further check whether at least one vacant sample tube storage position is available or not in the at least one storage subsection which was determined for consolidating the identified at least two sample tubes which have at least one substantially identical sample tube attribute. If at least one vacant sample tube storage position is available in the determined storage subsection, the resorting station can transport the at least one of the at least two sample tubes to the determined subsection as described in the fourth sub-step below.

In a third sub-step of step b), if no sample tube storage position(s) within the determined storage subsection is vacant, at least one sample tube which has not to be consolidated can be transported to a vacant sample tube storage position of a sample tube storage rack with sample tubes which have not to be consolidated. Alternatively, if no sample tube storage position(s) are vacant in the determined storage subsection, step b) of the method can be aborted.

In a fourth sub-step of step b), the resorting station can transport the at least one of the at least two sample tubes to the at least one storage subsection which was determined for consolidating the at least two sample tubes with the at least one substantially identical sample tube attribute.

In another embodiment, the resorting station may be positioned outside of the storage section. And the laboratory storage and retrieval system may further comprise at least two rack storage positions which can be located outside of the storage section at the resorting station in such a manner that the gripper attached to the robotic arm may access any sample tube inserted in sample tube storage positions of sample tube storage racks which have been transported to the rack storage positions at the resorting station by the sample tube rack transport device. And step b) may comprise the following sub-steps:

In a first sub-step of step b), the control device may determine the at least one storage subsection in which the at least two sample tubes with the at least one substantially identical sample tube attribute can be consolidated.

In a second sub-step of step b), the control device may further check whether at least one vacant sample tube storage position is available or not in the at least one storage subsection which was determined for consolidating the at least two identified sample tubes having at least one substantially identical sample tube attribute. If at least one vacant sample tube storage position is available in the determined storage subsection, the sample tube rack transport device can transport the at least two sample tube racks to the rack storage positions at the resorting station.

In a third sub-step of step b), if no sample tube storage position(s) within the determined storage subsection is vacant, the sample tube rack transport device can transport the at least two sample tube racks with the at least two identified sample tubes to be consolidated and at least one additional sample tube storage rack with at least one vacant sample tube storage position to the rack storage positions at the resorting station. Subsequently, the resorting station can transport at least one sample tube which has not to be consolidated to the vacant sample tube storage position of the at least one additional sample tube storage rack; or if no sample tube storage position(s) are vacant in the determined storage subsection, step b) of the method can be aborted.

In a fourth sub-step of step b), the resorting station transports the at least one of the at least two sample tubes to the at least one storage subsection which was determined for consolidating the at least two sample tubes with the at least one substantially identical sample tube attribute. Subsequently, the sample tube rack transport device transports the at least two sample tube storage racks back to the rack storage positions within the storage section.

In one embodiment, the sample tube storage positions of at least two sample tube storage racks can be partially occupied with sample tubes. Usually, all sample tube storage positions of a sample tube storage rack are occupied with sample tubes when a sample tube storage rack with new incoming sample tubes to be stored are transported into the storage section for the first time. However, over time individual sample tubes can be retrieved for further test sample processing steps (e.g., new analysis or test of the test sample in the case of an ordered rerun test, repeat test or reflex test of a test sample) and isolated vacant sample tube storage positions occur in a sample tube storage rack which cannot be efficiently be reoccupied. Thus, the overall capacity of the storage section can decrease over time. By consolidating test sample tubes from at least two partially filled sample tube racks, at least one substantially full and at least one substantially empty sample tube storage rack can be created for storing new test sample tubes. Accordingly, the overall storing capacity of the storage section can be improved as isolated vacant sample tube storage positions in a sample tube storage rack can be reduced.

In one embodiment, less than 90% of the sample tube storage positions of at least two sample tube storage racks can be occupied by sample tubes. In order to keep the sample tube storage capacity of the storage section on a high level, the method for consolidating sample tubes can be initiated as soon as 10% or more than 10% of the sample tube storage positions of a sample tube storage rack are not occupied. So, the number of vacant sample tube storage positions can be used to set a threshold for triggering the consolidation of sample tubes. Based on specific sample tube storage requirements of a laboratory environment which may depend on the available laboratory space, the number of pre-analytical and analytical stations, and throughputs of each pre-analytical and analytical station, the percentage of occupied sample tube storage positions for triggering the consolidation of sample tubes may be configurable. Additionally, the threshold for triggering the consolidation of sample tubes may be dynamic and may depend on the current workload and/or scheduled sample tube handling steps of the laboratory storage and retrieval system.

In one embodiment, the at least one substantially identical sample tube attribute can be selected from a group comprising: a boarding timestamp, onboard time, scheduled storage time, scheduled retrieval time point, retrieval time, scheduled disposing time point, sample tube type, sample tube content, or a combination thereof.

The term "boarding timestamp" as used herein can relate to a recorded and stored time point at which sample tubes to be stored are transported into the storage section. Sample tubes with a substantially identical boarding timestamp have been transported into the storage section at the same time point (e.g. sample tubes within the same sample tube storage rack) or within the same predefined time range (e.g. within one hour or working shift). The boarding timestamp may be recorded via detection and identification of a sample tube or corresponding sample tube storage rack using for example a barcode scanner, RFID reader, or camera. Alternatively, the boarding timestamp may be recorded via activity of the sample tube transport system when transporting sample tubes or sample tube storage racks into the storage section. Depending on the boarding timestamp, the at least one storage subsection in which the at least two sample tubes with at least one substantially identical boarding timestamp are consolidated may be determined.

The term "onboard time" as used herein can relate to the time or duration a sample tube is located or stored in the storage section of the laboratory storage and retrieval system. Sample tubes with a substantially identical onboard time can be stored in the storage section for the same time or time range. The onboard time may be determined via boarding timestamp and current date and time, scheduled retrieval time point, or scheduled disposing time point. The onboard time of a sample tube may be cumulative when a sample tube is stored and retrieved several times. Depending on the onboard time, the at least one storage subsection in which the at least two sample tubes with at least one substantially identical onboard time are consolidated may be determined. For example, sample tubes with a longer onboard time may be consolidated in a storage subsection(s) which can be farther away from the gate as the chance for retrieval may decrease over time.

The term "scheduled storage time" as used herein can relate to a planned time or duration a sample tube can be stored in the storage section. Sample tubes with a substantially identical scheduled storage time can be stored in the storage section for the same time or time range. The scheduled storage time may depend on other sample tube attributes such as, as non-limiting examples, scheduled retrieval time point, scheduled disposing time point, sample tube content like the expiration date of a test sample. Alternatively, the user can configure the scheduled storage time. Depending on the scheduled storage time, the at least one storage subsection in which the at least two sample tubes with at least one substantially identical scheduled storage time are consolidated may be determined.

The term "scheduled retrieval time point" as used herein can relate to a planned time point at which the sample tube can be retrieved from the storage section of the storage and retrieval system. Sample tubes with a substantially identical scheduled retrieval time point can be retrieved from the storage section at the same time (e.g. sample tubes within the same sample tube storage rack) or within the same time range (e.g. within one hour or working shift). This attribute may depend on requested test orders which can be communicated from a data management unit to the laboratory storage and retrieval system. Depending on the scheduled retrieval time point, the at least one storage subsection in which the at least two sample tubes with at least one substantially identical scheduled retrieval time point are consolidated may be determined.

The term "retrieval time" as used herein can relate to a given or predefined time a test sample has to be retrievable from the laboratory storage and retrieval system so that the sample tube can be available for further test sample processing steps within a certain time. Sample tubes with a substantially identical retrieval time have to be retrievable from the storage section within a given time or time range. The retrieval time may depend on the sample tube content. And depending on the retrieval time, the at least one storage subsection in which the at least two sample tubes with at least one substantially identical retrieval time are consolidated may be determined. For example, the retrieval time of urgent samples for which a short turn-around time is required (STAT samples) can typically be shorter than the retrieval time for non-urgent test samples. Accordingly, such STAT samples can be consolidated in storage subsections which can be close to the gate of the storage so that they can be retrieved from the laboratory storage and retrieval system and transported to pre-analytical and/or analytical stations in shortest time.

The term "scheduled disposing time point" as used herein can relate to a planned time point at which stored sample tubes will be wasted. Sample tubes with a substantially identical scheduled disposing time point can be wasted at the same time or time range. This attribute may depend on the sample attribute sample tube content like the expiration date of a test sample. Alternatively, the user can manually schedule the disposal of stored sample tubes, e.g., as soon as no further tests of a certain test sample is required or scheduled. Depending on the scheduled disposing time point, the at least one storage subsection in which the at least two sample tubes with at least one substantially identical scheduled disposing time point are consolidated may be determined. For example, sample tubes for which the disposing time point is scheduled within the next working shift may be consolidated in a storage subsection(s) which can be close to the disposal unit of the laboratory storage and retrieval system.

The term "sample tube type" as used herein can relate to the dimension, geometry, and/or material of the sample tube and/or sample tube cap. Depending on the sample tube content, sample processing steps to be carried out, and the type of the material as well as the dimension of the sample tube and/or sample tube cap such as, for example, diameter, side length, height and geometry may vary. Sample tubes with a substantially identical sample tube type can possess the same dimension or dimension range, the same geometry or geometry range, the same material or comparable material, and/or the same or comparable sample tube cap. Depending on the sample tube type, the at least one storage subsection in which the at least two sample tubes with at least one substantially identical sample tube type are consolidated may be determined. For example, the consolidation can be done on the basis of the sample tube height so that sample tube storage racks with tubes which are within a certain height range can be stored in specific subsections of the storage section, e.g., shelves with a corresponding height distance to the next shelf, so that damaging of sample tubes due to them being too high for a certain storage location can be avoided.

The term "sample tube content" as used herein can relate to the test sample stored in the sample tube such as, as non-limiting examples, blood sample, urine sample, serum sample, plasma sample, or liquefied biopsy sample, and the like. Depending on the sample tube content, the at least one storage subsection in which the at least two sample tubes with at least one substantially identical sample tube content are consolidated may be determined. For example, depending on the sample tube content, the sample tube storage conditions which relate to storing conditions like temperature or humidity at which the test samples and their corresponding sample tubes have to be stored in order to keep the test sample quality and integrity for further test sample processing steps may vary. The attribute sample tube content may also relate to the weight or volume of the test sample stored in the sample tube. Furthermore, the attribute sample tube content may also relate to conducted and/or planned tests for a test sample. For instance, test samples for which delicate analytical tests such as polymerase chain reactions have been conducted or planned can be consolidated in dedicated and separate subsections of the storage section in order to prevent cross-contamination risks.

In one embodiment, each of the at least one substantially identical sample tube attribute can comprise a priority and the at least two sample tubes can be consolidated in the at least one storage subsection according to the substantially identical sample tube attribute with the highest priority. So, if the control device identifies at least two sample tubes with at least two substantially identical sample tube attributes for which at least two different subsections can be determined for consolidating the sample tubes, the at least two sample tubes can be consolidated in the at least one storage subsection which was determined by the control device based on the substantially identical sample tube attribute which comprises the higher priority.

In another embodiment, the priority of each of the at least one substantially identical sample tube attribute can be configurable. The requirements of a laboratory storage and retrieval system may depend on specific laboratory workflows and may vary from laboratory to laboratory. Therefore, the user can define for each substantially identical sample tube attribute a certain priority which can then be used for the consolidation of stored sample tubes. Alternatively, the configuration of priorities may be based on historical and/or current operation information of the laboratory storage and retrieval system and the priority of each substantially identical sample tube attribute may change over time.

In another embodiment, the at least one substantially identical sample tube attribute scheduled disposing time point can have the highest priority. With the prioritization of the scheduled disposing time point, an efficient disposal of stored samples tubes can be achieved and the storage capacity of the storage section can be improved.

In one embodiment of the method, the storage section can comprise a gate and one of the at least two storage subsections can be closer to the gate than the other one of the at least two storage sections. And the sample tubes for which the at least one substantially identical sample tube attribute scheduled retrieval time point is within the next 24 hours can be consolidated in the one of the at least two storage sections which can be closer to the gate. This sample tube consolidation can have the advantage that sample tubes which can be retrieved within the next 24 hours can already be located in a subsection which is close to the gate of the storage section and the retrieval time of those sample tubes can be shortened. In particular, for urgent test samples for which a short turn-around time is required (STAT test samples), a short retrieval time and fast availability to conduct the ordered test(s) and to provide the test result in time can be essential.

In a further embodiment of the method, the storage section can comprise a gate and one of the at least two storage subsections can be closer to the gate than the other one of the at least two storage subsections. And the sample tubes for which the at least one substantially identically sample tube attribute onboard time is less than 24 hours can be consolidated in the one of the at least two storage sections which is closer to the gate. Typically, additional test orders for stored test samples such as repeat tests, rerun tests and/or reflex tests can be expected within the first 24 hours after the test sample was transported to the storage section. Accordingly, the retrieval time of the laboratory storage and retrieval system can further be improved by consolidating sample tubes for which further test orders can be expected within the next 24 hours in the subsection which is closer to the gate.

In a further embodiment, the storage section can comprise a gate and one of the at least two storage subsections can be closer to the gate than the other one of the at least two storage sections. And the sample tubes for which the at least one substantially identical sample tube attribute boarding timestamp is within a same working shift can be consolidated in the one of the at least two storage sections which is farther away to the gate at the end of the same working shift. With this sample tube consolidation, the storing capacity of the storage subsection which is closer to the gate can be increased without interrupting with the main operational functions of the laboratory storage and retrieval system such as storing and retrieving of sample tubes. At the same time, the performance of the laboratory storage and retrieval system for storing new incoming test sample tubes can be improved as the transportation distance and corresponding transportation time between the gate and rack storage positions can be as short as possible.

In an additional embodiment of the method, the storage section can comprise a gate and one of the at least two storage subsections can be farther away from the gate than the other one of the at least two storage subsections, wherein sample tubes for which the at least one substantially identical sample tube attribute scheduled storage time is more than 24 hours can be consolidated in the one of the at least two storage sections which is farther away from the gate. Also with this sample tube consolidation, the capacity of the storage subsection which is closer to the gate can be improved which can lead to an improved performance of storing and retrieving new test sample tubes.

In one embodiment of the method, the method can be conducted at a time when no sample tube storage racks with new incoming sample tubes are transported into the storage section and/or when no sample tube storage racks with sample tubes for which a retrieval time point is scheduled can be transported out of the storage section. The laboratory storage and retrieval system can conduct multiple and different sample tube handling steps which can be divided into two groups. One group of sample tube handling steps can relate to main operational functions such as storing and retrieving of sample tubes. The other group of sample tube handling steps can relate to supporting functions such as wasting and consolidating of stored sample tubes in order to keep or restore the storing capacity as well as the storing and retrieval performance of the laboratory storage and retrieval system. As the laboratory storage and retrieval system conducts those different sample tube handling steps with the same hardware components like the sample tube transport system, the different sample tube handling steps have to be orchestrated. Accordingly, the main operational functions may be prioritized over the supporting functions to ensure an optimal operation of the laboratory storage and retrieval system.

In one embodiment, the laboratory storage and retrieval system can further comprise a sample tube disposal unit. And prior to step a) of the method, at least one sample tube storage rack comprising sample tubes for which a disposal time point is scheduled can be transported to the sample tube disposal unit for disposing the sample tubes. The disposal unit may be comprised by the storage section. The disposal unit can be connected with the storage section via an internal opening in a wall separating the storage section from the disposal unit. Through this opening, sample tube storage racks with sample tubes whose expiration date has elapsed or for which a disposal time point is scheduled can be placed in the disposal unit. Alternatively, the disposal unit can be used for the temporary storage of sample tube storage racks when, for example, at least one vacant rack storage position in at least one of the at least two storage subsections is required for consolidating the at least two sample tubes having at least one substantially identical sample tube attribute.

In one embodiment of the method, in the first step of the method as described herein, the control device can identify the at least two sample tubes by analyzing the database comprising the sample tube inventory of the storage section. The sample tube inventory of the storage section can comprise information about the sample tube identity, the at least one substantially same sample tube attribute, and the sample tube position of each stored sample tube in the storage section.

A laboratory storage and retrieval system is also presented. The laboratory storage and retrieval system can comprise a storage section, a sample tube transport system, a database comprising a sample tube inventory of the storage section, and a control device configured to execute the steps of the method to store sample tubes in the laboratory storage and retrieval system as described herein.

In one embodiment of the laboratory storage and retrieval system, the control device and the database can be comprised by the laboratory storage and retrieval system.

In another embodiment of the laboratory storage and retrieval system, the control device can be an external control device communicatively connected to the laboratory storage and retrieval system and the data base can be an external database communicatively connected to the external control device.

A computer program product is also presented. The computer program product can comprise instructions to cause the laboratory storage and retrieval system as described herein to execute the steps of the method to store sample tubes in the laboratory storage and retrieval system as described herein.

A computer-readable medium is also presented. The computer-readable medium can have stored thereon the computer program product comprising instructions to cause the laboratory storage and retrieval system as described herein to execute the steps of the method to store sample tubes in the laboratory storage and retrieval system as described herein.

Figure 1A:
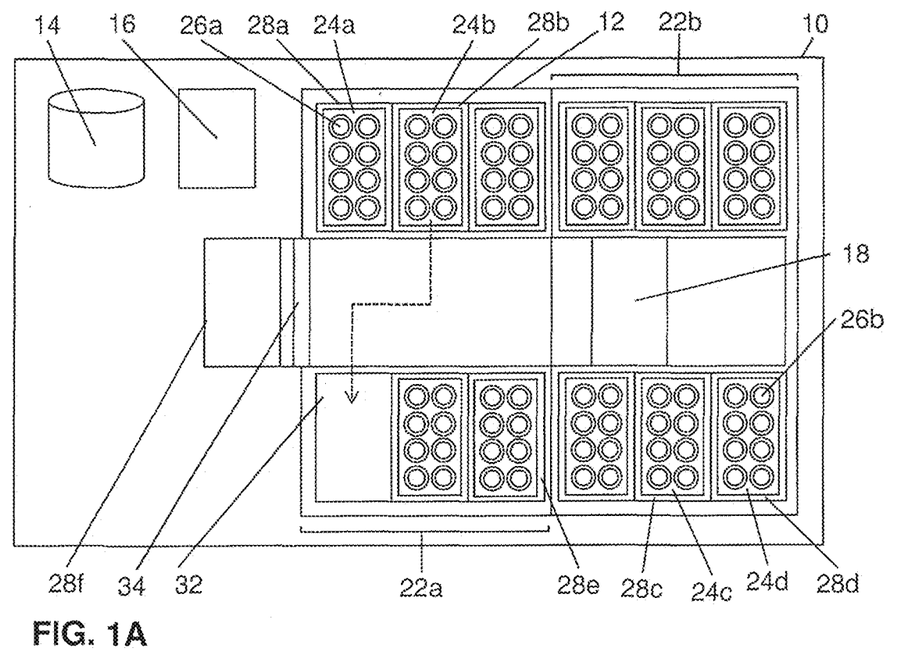
FIGS. 1A-D illustrate consolidating at least two sample tubes in at least one storage subsection based on an example according to an embodiment of the present disclosure.
Figure 1B:
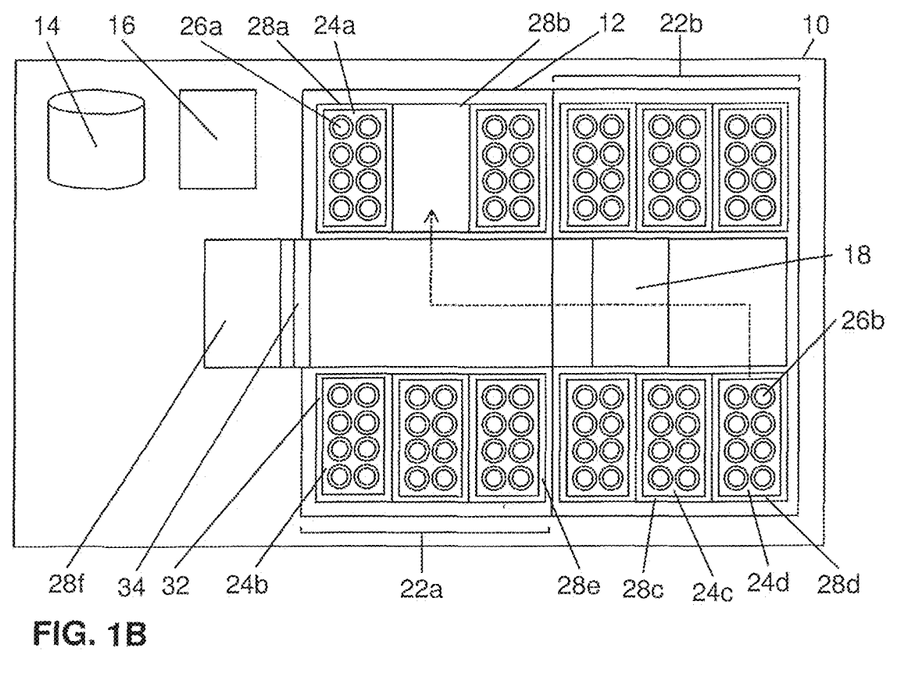
Figure 1C:
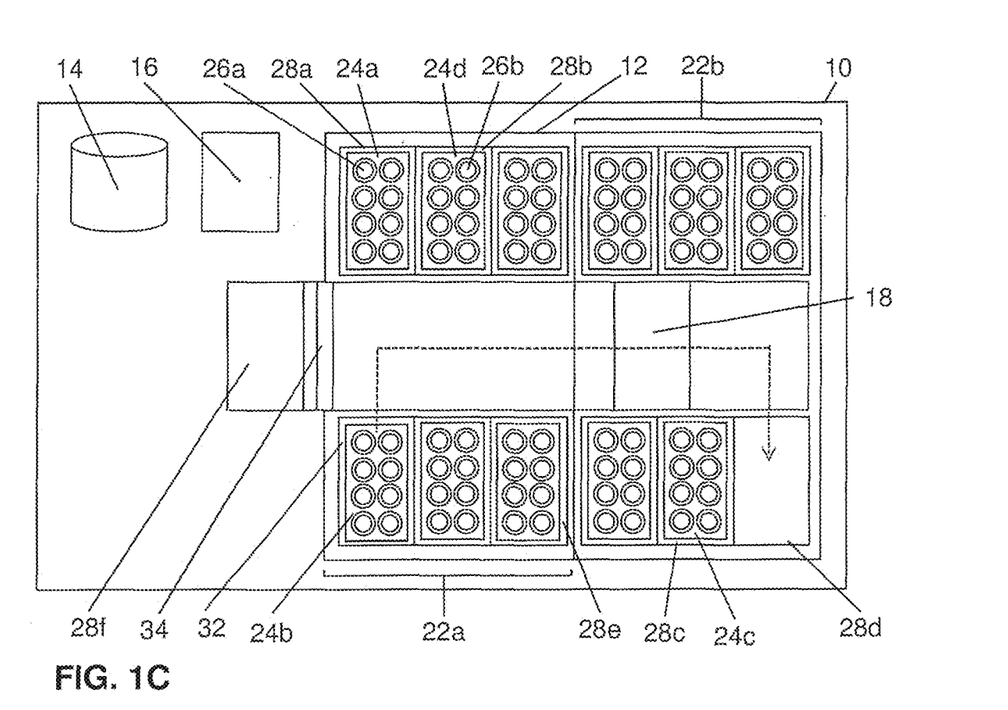
Figure 1D:
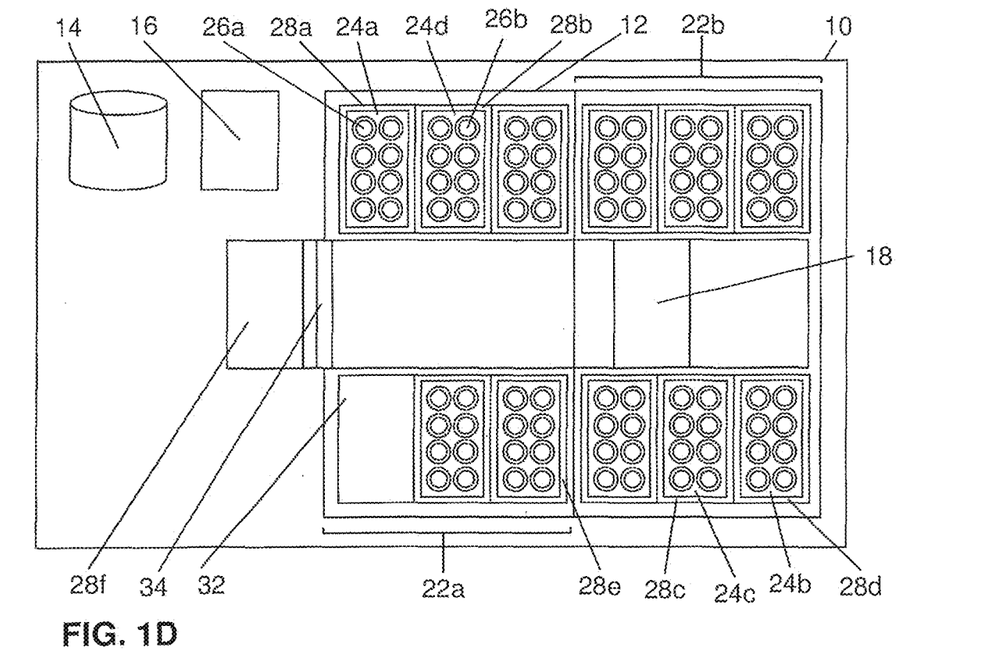
Figure 2A:
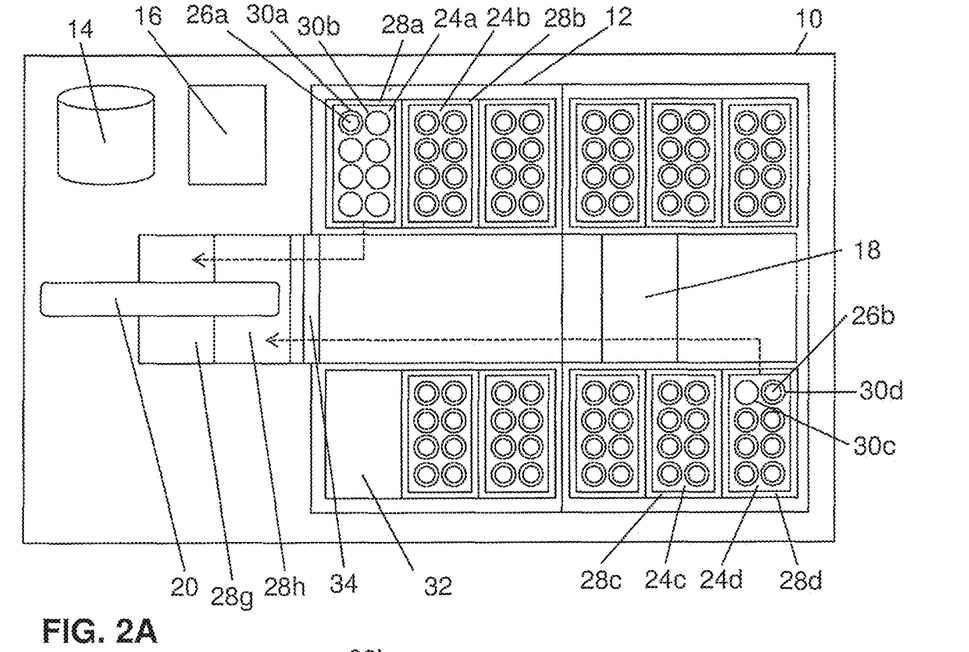
FIGS. 2A-D illustrate consolidating at least two sample tubes in at least one storage subsection based on a further example according to an embodiment of the present disclosure.

In FIG. 1A-D, a schematic representation of a laboratory storage and retrieval system 10 is shown in order to depict one embodiment of the method for consolidating at least two sample tubes 26a, 26b which have at least one substantially identical sample tube attribute 17 in at least one storage subsection 22a, 22b. The laboratory storage and retrieval system 10 can comprise a storage section 12, a sample tube transport system 18 comprising a sample tube rack transport device 18, a database 14 comprising a sample tube inventory of the storage section 15, and a control device 16. The shown storage section 12 can comprise at least two storage subsections 22a, 22b which can be at least two parts of the storage section 22a, 22b. At least one storage subsection 22a of the at least two storage subsection 22a, 22b can be closer to the gate of the storage section 34 than the other storage subsection 22b. Each storage subsection 22a, 22b can comprise at least two rack storage positions 28a, 28b, 28c, 28d for storing at least two sample tube storage racks 24a, 24b, 24c, 24d. As shown in FIG. 2A, the laboratory storage and retrieval system 10 may further comprise at least one rack storage position 28f which can be located outside of the storage section 12 and can be used for the temporary storage of sample tube storage racks 24a, 24b, 24c, 24d. The shown storage section 12 can further comprise a disposal unit 32 which can be located in one of the storage subsections 22a and can be used for the disposal of expired sample tubes or for the temporary storage of at least one sample tube storage rack 24a, 24b, 24c, 24d. The sample tube rack transport device 18 can be designed to transport the at least two sample tube storage racks 24a, 24b, 24c, 24d to the at least two rack storage positions 28a, 28b, 28c, 28d within the storage section 12 and between the storage section 12 and the at least one rack storage position 28f which can be located outside of the storage section 12 through the gate of the storage section 34. Additionally, the sample tube rack transport device 18 can transport the at least two sample tube storage racks 24a, 24b, 24c, 24d to the disposal unit 32. In step a) of the method 58, the control device 16 can identify at least two sample tubes 26a, 26b with at least one substantially identical sample tube attribute 17 and which can be distributed over the at least two storage subsections 22a, 22b by analyzing the database 14 comprising the sample tube inventory of the storage section 15. In a first sub-step of step b) 62, the control device 16 may determine in which of the at least two storage subsections 22a, 22b the identified at least two sample tubes 26a, 26b with the at least one substantially identical sample tube attribute 17 can be consolidated. For example, two sample tubes 26a, 26b can have the substantially identical sample tube attribute scheduled retrieval time point 44, e.g., a retrieval of both sample tubes 26a, 26b is scheduled within the next 24 hours. Therefore, the control device 16 can determine that the two identified sample tubes 26a, 26b can be consolidated in the storage subsection 22a which is closer to the gate of the storage section 34 in order to shorten the retrieval time of the two sample tubes 26a, 26b. In a second sub-step of step b) 64, the control device 16 can then check whether at least one vacant storage rack storage position is available or not in the storage subsection 22a which was determined for consolidating the identified at least two sample tubes 26a, 26b. In the shown example, none of the at least two rack storage positions 28a, 28b within the determined storage subsection 22a are vacant. Thus, in a third sub-step of step b) 66 the sample tube rack transport device 18 can transport at least one of the stored sample tube storage racks 24b with sample tubes which are not to be consolidated to the disposal unit 32 for temporary storage as indicated by the dashed arrow in FIG. 1A. Alternatively, one of the stored sample tube storage racks 24b with sample tubes which are not to be consolidated can be transported to the vacant rack storage position 28f which can be located outside of the storage section 12. In a fourth sub-step of step b) 68 and as indicated by a dashed arrow in FIG. 1B, the at least one of the at least two sample tube storage racks 24d which is farther away from the gate 34 and hosts at least one of the at least two identified the sample tube 26b can be transported by the sample tube rack transport device 18 to the at least one rack storage position 24b which is now vacant in order to consolidate the at least two identified sample tubes 26a, 26b in the determined storage subsection 22a. In order to release the disposal unit 32, the sample tube storage rack 24b which was temporary stored at the disposal unit 32 can be transported from the disposal unit 32 to the now vacant rack storage position of the storage subsection 28d which is farther away from the gate of the storage section 34, as indicated by a dashed arrow in FIG. 2 C. In FIG. 1D, the at least two identified sample tubes 26a, 26b which have the at least one substantially identical sample tube attribute 17 are now consolidated in at least one of the at the at least two storage subsections 22a which is closer to the gate of the storage 34 compared to the at least one other storage subsection 22b and the disposal unit 32 can again be vacant and can be used for the temporary storage of sample tube storage racks 24a, 24b, 24c, 24d or for the disposal of expired sample tubes.

Figure 2B:
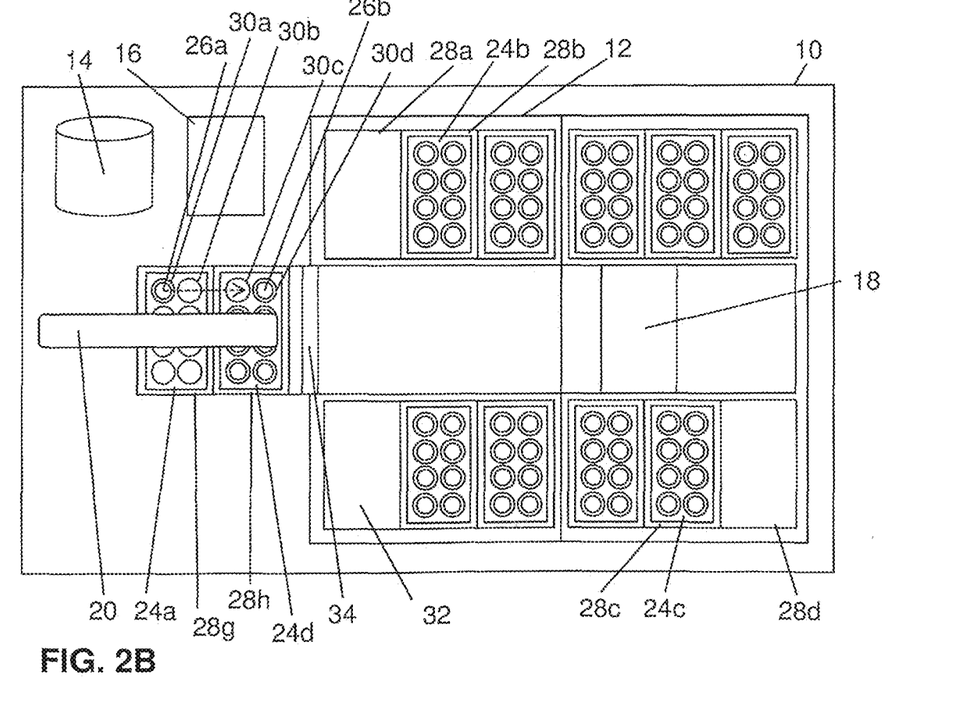
Figure 2C:
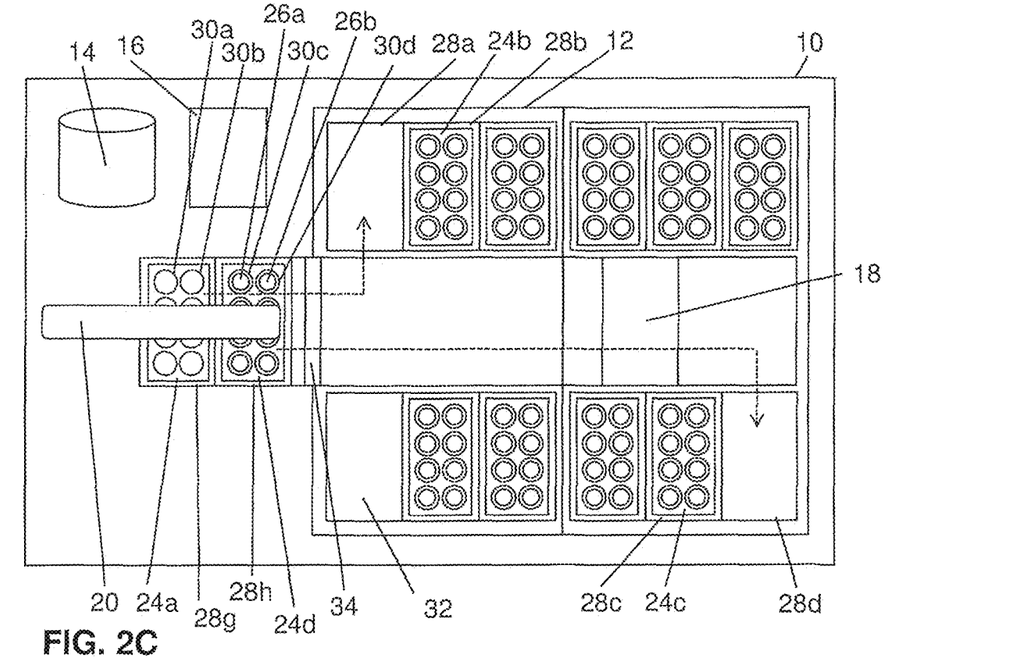
Figure 2D:
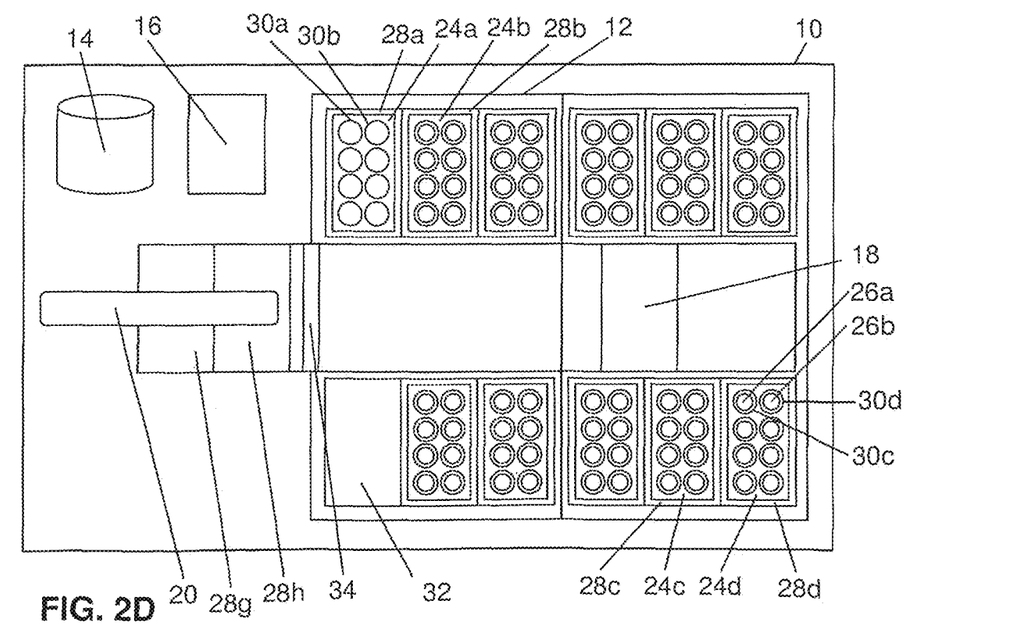

In FIG. 2A-D, a further embodiment of the method for consolidating at least two sample tubes 26a, 26b with at least one substantially identical sample tube attribute 17 in at least one storage subsection 24a, 24d is shown. As shown schematically, the sample tube transport system 18, 20 of the laboratory storage and retrieval system 10 can comprise a sample tube rack transport device 18 and a resorting station 20. The laboratory storage and retrieval system 10 can further comprise at least two rack storage positions 28g, 28h which can be located outside of the storage section 12 at the resorting station 20 so that the resorting station 20 can access sample tubes 26a, 26b inserted in sample tube storage positions 30a, 30b, 30c, 30d of the sample tube storage racks 24a, 24d for resorting sample tubes 26a, 26b between the at least two sample tube storage racks 24a, 24d when the at least two sample tube storage racks 24a, 24d are located on the at least two rack storage positions 28g, 28h. The sample tube rack transport device 18 can be designed to transport sample tube storage racks 24a, 24b, 24c, 24d within the storage section 12 and between the storage section 12 and the resorting station 20 through the gate of the storage section 34 in order to transport the sample tube storage racks 24a, 24d to rack storage positions 28a, 28d, 28g, 28h. The storage section 12 can comprise at least two storage subsections 24a, 24d which can be two sample tube storage racks 24a, 24d. Each of the at least two sample tube storage racks 24a, 24d can comprise at least two sample tube storage positions 30a, 30b, 30c, 30d. One of the storage subsections 24a can be located on a rack storage position 28a which can be closer to the gate of the storage section 34 than the rack storage position 28d on which the other storage subsection 24d can be located. In step a) of the method 58, the control device 16 can identify at least two sample tubes 26a, 26b with at least one substantially identical sample tube attribute 17 and distributed over the at least two storage subsections 24a, 24d by analyzing the database 14 comprising the sample tube inventory of the storage section 15. For example, two sample tubes 26a, 26b can have the at least one substantially identical sample tube attribute scheduled storage time 42 which can be more than 24 hours. In a first sub-step of step b) 62, the control device 16 can further determine that the at least two identified sample tubes 26a, 26b can be consolidated in the storage subsection 24d which is farther away from the gate of the storage section 34. In a second sub-step of step b) 64, the control device 16 can check whether at least one vacant sample tube storage position is available or not in the storage subsection 24d which was determined for consolidating the identified at least two sample tubes 26a, 26b. In the shown example, the sample tube storage positions 30a, 30b, 30c, 30d of the at least two sample tube storage racks 24a, 24d can be partially occupied with sample tubes 26a, 26d and at least one sample tube storage position 30c can be vacant. Thus, no third sub-step of step b) for creating a vacant sample tube storage position can be required and the two sample tube storage racks 24a, 24d with the two identified sample tubes 26a, 26b which have to be consolidated can be transported to the rack storage positions 28g, 28h at the resorting station 20 by the sample tube rack transport device 18 as indicted by the dashed arrow in FIG. 2A. As shown in FIG. 2B by a dashed arrow, in a fourth sub-step of step b) 68, the resorting station 20 can then transport one of the at least two identified sample tubes 26a of the at least one storage subsection 24a which was closer to the gate of the storage section 34 to the vacant sample tube storage position 30c of the other one of the at least two sample tube storage racks 24d which was determined for consolidating the at least two sample tubes 26a, 26b. Subsequently, both sample tube storage racks 24a, 24b can be transported back to the rack storage positions 28a, 28d as indicated by the dashed arrows in FIG. 2C. As shown in FIG. 2D, by consolidating the at least two test sample tubes 26a, 26b from at least two partially filled sample tube racks 24a, 26d at least one substantially full sample tube rack 24d and at least one substantially empty sample tube storage rack 24a can be created. As the at least one substantially empty sample tube storage rack 24a is closer to the gate of the storage section 34, the empty sample tube storage rack 24a can quickly be provided as soon as new incoming sample tubes have to be stored in the storage section 12. Accordingly, the efficiency of the main operational function sample storing of the laboratory storage and retrieval system 10 can be improved.

Figure 3:
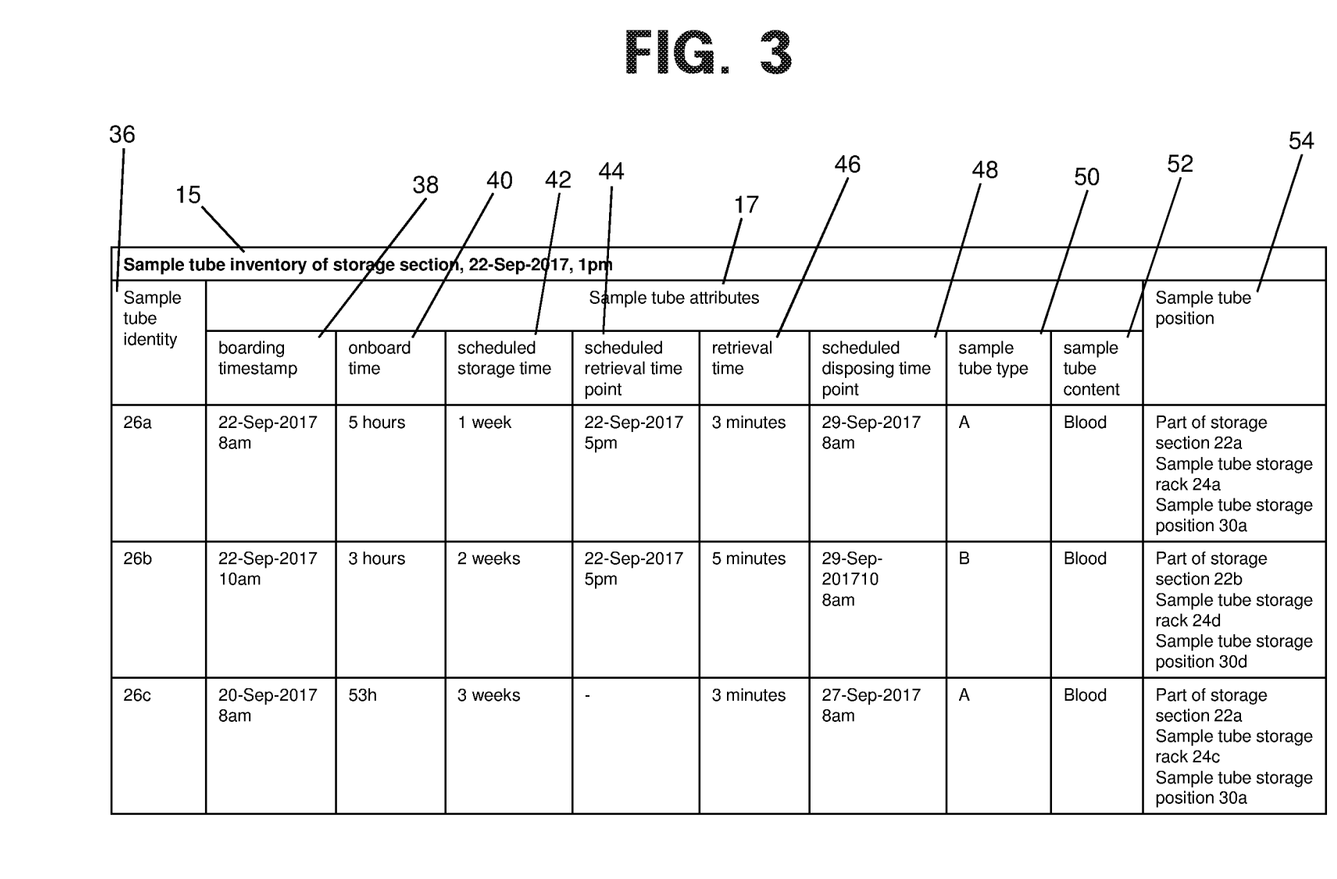
FIG. 3 illustrates a data concept of the sample tube inventory of the storage section according to an embodiment of the present disclosure.

FIG. 3 shows an example of a data concept for the sample tube inventory of the storage section 15. The sample tube inventory of the storage section 15 can comprise information about the sample tube identity 36, the sample tube attributes 17, and the sample tube position 54 of each stored sample tube in the storage section 12. The at least one substantially identical sample tube attribute 17 can be selected from a group comprising:

a boarding timestamp 38,
an onboard time 40,
a scheduled storage time 42,
a scheduled retrieval time point 44,
a retrieval time 46,
a scheduled disposing time point 48,
a sample tube type 50, and
a sample tube content 52.

In the shown example, the two sample tubes with the sample tube identity 26a and 26b can have the at least one substantially identical sample tube attribute scheduled retrieval time point 44 and can be distributed over two subsections 22a, 22b, 24a, 24d.

Figures 4A, 4B:
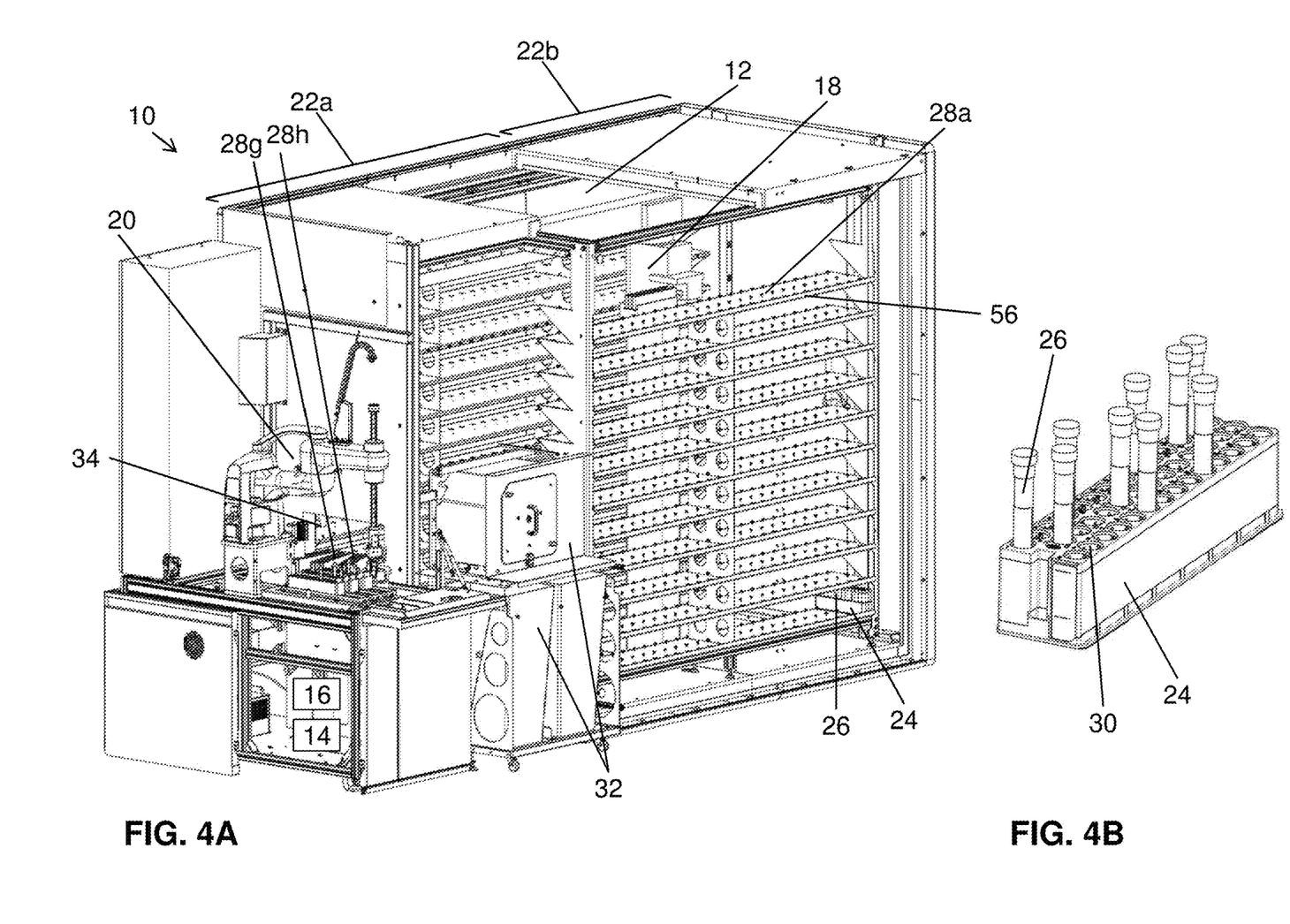
FIGS. 4A-B illustrate a perspective view of the laboratory storage and retrieval system and a sample tube storage rack according to an embodiment of the present disclosure.

FIGS. 4A and 4B show perspective views of a laboratory storage and retrieval system 10 and a sample tube storage rack 24. As shown in FIG. 4A, the laboratory storage and retrieval system 10 can comprise a storage section 12, a sample tube transport system 18, 20 comprising a sample tube rack transport device 18 and a resorting station 20, a database 14 comprising a sample tube inventory of the storage section 15, a control device 16, and a disposal unit 32. The storage section 12 can comprise a front part 22a and a rear part 22b which can divide the storage section into the two storage subsections 22a, 22b. One of the two storage subsections 22a can be closer to gate of the storage section 34 compared to the other storage subsection 22b. Both subsections 22a, 22b can comprise multiple shelves 56 and each shelf, in turn, can comprise multiple rack storage positions 28 for storing sample tube storage racks 24. The sample tube rack transport device 18 can be designed to transport sample tube storage racks 24 to the multiple rack storage positions 28 within the storage section 12 and between the storage section 12 and the at least two rack storage positions 28g, 28h which can be located outside of the storage section at the resorting station 20 through the gate of the storage section 34. Additionally, the sample tube rack transport device 18 can transport sample tube storage racks to the disposal unit 32 for the disposal of expired sample tubes 26 or for the temporary storage of sample tube storage racks 24. In FIG. 4B, a single sample tube storage rack 24 which can comprise multiple sample tube storage positions 30 which are holding openings. The sample tube storage positions 30 of the shown sample tube storage rack 24 can be partially occupied with sample tubes 24 of the same sample tube type.

Figure 5:
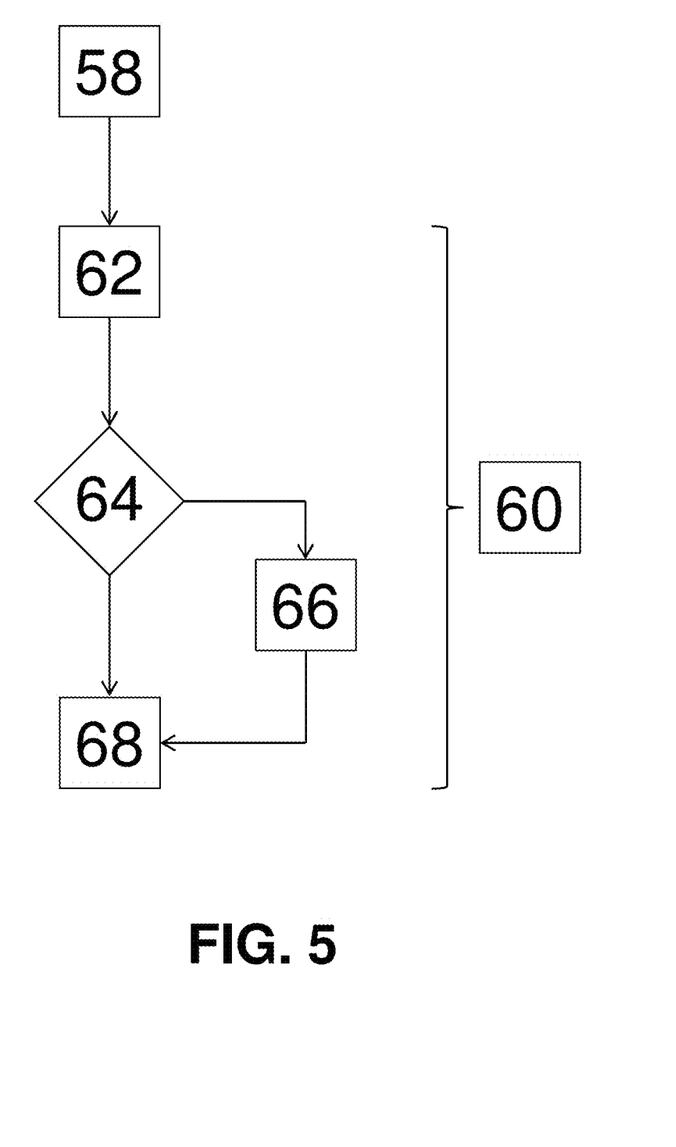
FIG. 5 illustrates a flowchart of the method for consolidating at least two sample tubes in at least one storage subsection according to an embodiment of the present disclosure.

FIG. 5 depicts a flowchart of an embodiment of the method for consolidating at least two sample tubes which have at least one substantially identical sample tube attribute in at least one storage subsection. In step a) 58 of the method, the control device 16 can identify at least two sample tubes 26a, 26b with at least one substantially identical sample tube attribute 17 and which can be distributed over the at least two storage subsections 22a, 22b, 24a, 24d by analyzing the database 14 comprising the sample tube inventory of the storage section 15. In step b) 60, the at least one sample tube transport system 18, 20 can consolidate the at least two sample tubes 26a, 26b in at least one storage subsection 22a, 22b, 24a, 24d. As shown in FIG. 5, step b) 60 may comprise four sub-steps 62, 64, 66, 68. In a first sub-step of step b) 62, the control device 16 can determine the at least one storage subsection 22a, 22b, 24a, 24d in which the at least two sample tubes 26a, 26b with the at least one substantially identical sample tube attribute 17 can be consolidated. In the second sub-step of step b) 64, the control device 16 can further check whether at least one vacant rack storage position or sample tube storage position is available or not in the at least one storage subsection 22a, 22b, 24a, 24d which was determined for consolidating the identified at least two sample tubes 26a, 26b which have at least one substantially identical sample tube attribute 17. If at least one vacant rack storage position or sample tube storage position is available in the determined storage subsection 22a, 22b, 24a, 24d, the sample tube transport system can transport 18, 20 the at least one of the at least two sample tubes 26, 26b to the determined subsection 22a, 22b, 24a, 24d in a fourth sub-step of step b) 68. If no rack storage position(s) within the determined storage subsection 22a, 22b is vacant, in a third sub-step of step b) 66, at least one sample tube storage rack 24b with sample tubes which have not to be consolidated can be transported to a disposal unit 32 of the laboratory storage and retrieval system or to a vacant rack storage position 28f which may be located outside of the determined subsection for temporary storage. Or if no sample tube storage position(s) within the determined storage subsection 24a, 24d is vacant, in a third sub-step of step b), at least one sample tube which does not have to be consolidated can be transported to a sample tube storage rack which is partially filled with sample tubes which have not to be consolidated. Alternatively, if no rack storage position(s) or sample tube storage position(s) are vacant in the determined storage subsection 22a, 22b, 24a, 24d, the consolidation of the at least two sample tubes 26a, 26b which have at least one substantially identical sample tube attribute 17 can be aborted. Finally, in a fourth sub-step of step b), the sample tube transport system 18, 20 can transport the at least one of the at least two sample tubes 26a, 26b to the at least one storage subsection 22a, 22b, 24a, 24d which was determined for consolidating the at least two sample tubes 26a, 26b with the at least one substantially identical sample tube attribute 17.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

For the purposes of describing and defining the present disclosure, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A method to store sample tubes in a laboratory storage and retrieval system, the laboratory storage and retrieval system comprising a storage section for storing sample tubes under predefined and controlled temperature and humidity storing conditions, a database comprising a sample tube inventory of the storage section, a control device, and at least one sample tube transport system, wherein the storage section comprises at least two storage subsections and wherein the control device controls the database comprising the sample tube inventory of the storage section and the at least one sample tube transport system, the method comprising:
   a) identifying by the control device at least two sample tubes with at least one identical sample tube attribute and distributed over the at least two storage subsections;
   b) consolidating by the at least one sample tube transport system the at least two sample tubes in at least one storage subsection, wherein the consolidation is triggered as soon as 10% or more than 10% of sample tube positions in the at least one storage subsection are not occupied, and wherein the at least one storage subsection comprises three rows with more than ten sample tube storage positions each; and
   c) determining by the control device in which of the at least two storage subsections the identified sample tubes are consolidated.

2. The method according to claim 1, wherein the at least one sample tube transport system comprises a sample tube rack transport device, wherein the at least two storage subsections are at least two parts of the storage section, wherein each part of the storage section comprises at least two rack storage positions, and wherein the control device controls the sample tube rack transport device which transports sample tube storage racks within the storage section to step b).

3. The method according to claim 1, wherein the at least one sample tube transport system comprises a resorting station, wherein the at least two storage subsections are at least two sample tube storage racks, wherein each sample tube storage rack comprises at least two sample tube storage positions, and wherein the control device controls the resorting station which resorts sample tubes between at least two sample tube storage racks.

4. The method according to claim 3, wherein the sample tube storage positions of at least two sample tube storage racks are partially occupied with sample tubes.

5. The method according to claim 1, wherein the at least one sample tube transport system comprises a resorting station and a sample tube rack transport device, wherein the at least two storage subsections are at least two sample tube storage racks, wherein each sample tube storage rack comprises at least two sample tube storage positions, and wherein the control device controls the resorting station which resorts sample tubes between at least two sample tube storage racks and the sample tube rack transport device which transports sample tube storage racks within the storage section and between the storage section and the resorting station to step b).

6. The method according to claim 1, wherein the at least one identical sample tube attribute is selected from a group consisting of: a boarding timestamp, onboard time, scheduled storage time, scheduled retrieval time point, retrieval time, scheduled disposing time point, sample tube type, sample tube content, or combinations thereof.

7. The method according to claim 1, wherein each of the at least one identical sample tube attributes comprises a priority, wherein the at least two sample tubes are consolidated in the at least one storage subsection according to the identical sample tube attribute with the highest priority.

8. The method according to claim 1, wherein the storage section comprises a gate, wherein one of the at least two storage subsections is closer to the gate than the other one of the at least two storage subsections, and wherein sample tubes for which the at least one identical sample tube attribute is a scheduled retrieval time point that is within the next 24 hours are consolidated in the one of the at least two storage sections which is closer to the gate.

9. The method according to claim 1, wherein the storage section comprises a gate, wherein one of the at least two storage subsections is closer to the gate than the other one of the at least two storage subsections, wherein sample tubes for which the at least one identical sample tube attribute is an onboard time that is less than 24 hours are consolidated in the one of the at least two storage sections which is closer to the gate.

10. The method according to claim 1, wherein the storage section comprises a gate, wherein one of the at least two storage subsections is closer to the gate than the other one of the at least two storage subsections, wherein sample tubes for which the at least one identical sample tube attribute is a boarding timestamp that is within a same working shift are consolidated in the one of the at least two storage sections which is farther away from the gate at the end of the same working shift.

11. The method according to claim 1, wherein the storage section comprises a gate, wherein one of the at least two storage subsections is further away from the gate than the other one of the at least two storage subsections, wherein sample tubes for which the at least one identical sample tube attribute is a scheduled storage time that is more than 24 hours are consolidated in the one of the at least two storage sections which is farther away from the gate.

12. The method according to claim 1, wherein the method is conducted at a time when no sample tube storage racks with new sample tubes are transported into the storage section and/or when no sample tube storage racks with sample tubes for which a retrieval time point is scheduled are transported out of the storage section.

13. The method according to claim 1, wherein the laboratory storage and retrieval system comprises a sample tube disposal unit, wherein prior to step a) at least one sample tube storage rack comprising sample tubes for which a disposal time point is scheduled is transported to the sample tube disposal unit for disposing the sample tubes.

14. A laboratory storage and retrieval system, the laboratory storage and retrieval system comprising:
   the storage section;
   the database comprising the sample tube inventory of the storage section; and
   the control device configured to control the database and the at least one sample tube transport system to execute the method according to claim 1.

* * * * *